United States Patent
Barron et al.

(10) Patent No.: US 7,978,901 B1
(45) Date of Patent: Jul. 12, 2011

(54) CENTRALIZED PROCESSING OF CHECKS FOR DISTRIBUTED MERCHANT LOCATIONS

(75) Inventors: Tamila Barron, League City, TX (US); Bruce Dragt, Highlands Ranch, CO (US); Daniel Ahles, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 814 days.

(21) Appl. No.: 11/957,900

(22) Filed: Dec. 17, 2007

Related U.S. Application Data

(60) Provisional application No. 60/870,289, filed on Dec. 15, 2006.

(51) Int. Cl.
*G06K 9/00* (2006.01)
*G06Q 20/00* (2006.01)

(52) U.S. Cl. .......................... 382/138; 382/321; 705/75

(58) Field of Classification Search .................. 382/100, 382/101–103, 112–116, 135, 136, 137, 138, 382/139, 140, 155, 168, 173, 181, 193, 199, 382/202, 219, 231, 232, 274, 276, 278–294, 382/305, 312, 320, 321; 705/75, 45, 35; 235/379

See application file for complete search history.

(56) References Cited

U.S. PATENT DOCUMENTS

| | | | | |
|---|---|---|---|---|
| 5,265,007 A | * | 11/1993 | Barnhard et al. | 705/45 |
| 5,583,759 A | * | 12/1996 | Geer | 705/45 |
| 5,717,868 A | * | 2/1998 | James | 705/35 |
| 5,910,988 A | * | 6/1999 | Ballard | 705/75 |
| 5,930,778 A | * | 7/1999 | Geer | 705/45 |
| 5,936,219 A | * | 8/1999 | Yoshida et al. | 235/379 |
| 6,032,137 A | * | 2/2000 | Ballard | 705/75 |
| 6,129,272 A | | 10/2000 | Yoshida et al. | |
| 6,390,362 B1 | | 5/2002 | Martin | |
| 6,547,132 B1 | | 4/2003 | Templeton et al. | |
| 6,827,260 B2 | | 12/2004 | Stoutenburg et al. | |
| 6,886,742 B2 | * | 5/2005 | Stoutenburg et al. | 235/379 |

* cited by examiner

*Primary Examiner* — Seyed Azarian
(74) *Attorney, Agent, or Firm* — Kilpatrick Townsend & Stockton LLP

(57) ABSTRACT

According to one embodiment of the invention, a system can be provided to detect fraudulent activity occurring during check processing. Such fraudulent activity can be detected for example by monitoring the electronic check imaging process and performing checks on the data to determine anomalous occurrences that are indicative of fraudulent transactions.

14 Claims, 12 Drawing Sheets

CENTRALIZED PROCESSING OF CHECKS FOR DISTRIBUTED MERCHANT LOCATIONS

CROSS-REFERENCES TO RELATED APPLICATIONS

This application claims the benefit 35 USC §119(e) of U.S. Patent Application No. 60/870,289, filed on Dec. 15, 2006, entitled "Centralized Processing of Checks for Distributed Merchant Locations", and the above-mentioned application is hereby incorporated by reference in its entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND

It is currently difficult for a large business to monitor the processing of checks taking place across the business' network of store locations. Each store's imaging and/or processing efforts can encounter various problems that are not relayed to business management. As a result, management cannot apply the collective experience of the other store locations to address such problems.

Furthermore, with the advent of electronic check processing that takes place in the back office of a store location, for example, there will be new problems created in processing the checks. Again, management cannot address these problems until they are made aware of the situation.

One example of a problem will be the quality of imaged checks that are imaged in the back office of a store. With the advent of new regulations concerning back office conversion of checks, more and more companies will be imaging checks at the store location and submitting those images rather than the physical check for processing. Those images in turn will in some cases be converted to a data file for ACH processing through the Automated Clearinghouse. In other instances an image replacement document, or image exchange, will be used to process the check via Check 21 procedures. At any rate, during imaging of the checks at a store location, a store's machinery might become streaked or dirty resulting in poor image quality scans of the checks. As a result, some of the check data will be unreliable or a check might have to be scanned multiple times. This creates inefficiency throughout the check processing process due to unreadable data, erroneously read data, or resubmission of data. However, management cannot address this imaging problem until the problem is noticed. In the case of check imaging, a subtle deterioration in check images could take some time for a store manager to recognize. Thus, the problem could linger for some time until it is detected.

Another example that currently exists with check processing is fraud. Fraud can be perpetrated by individuals writing checks and can also be perpetrated by individuals within the corporate organization, such as cashiers who scan in checks, store managers, or others. As one example, a cashier who scans in a check so as to create an image for electronic check conversion, can be given the authority to correct information corresponding to a scanned check. This allows the cashier to address the issue of the check being illegible or the case of the hand-written dollar amount not corresponding to the numerically written dollar amount. As a result, it allows the cashier to adjust the amount of the check and thus provides an opportunity for fraud.

Thus, there is a need for a system that can address at least one of these deficiencies in the electronic processing of checks.

SUMMARY

According to one embodiment of the invention, a method is provided that includes distributed check processing at a plurality of store locations for purposes of electronic check deposit; creation of a centralized database, monitoring the check processing at the plurality of stores; determining anomalous check imaging results at least one of the plurality of stores and reporting back to the corporate headquarters, both in batch and real-time.

In accordance with another embodiment of the invention, electronic deciphering of check information can be performed on a check for aiding in the processing of the check.

Further embodiments of the invention will be apparent from the accompanying specification and figures.

DETAILED DESCRIPTION

Figure 1:
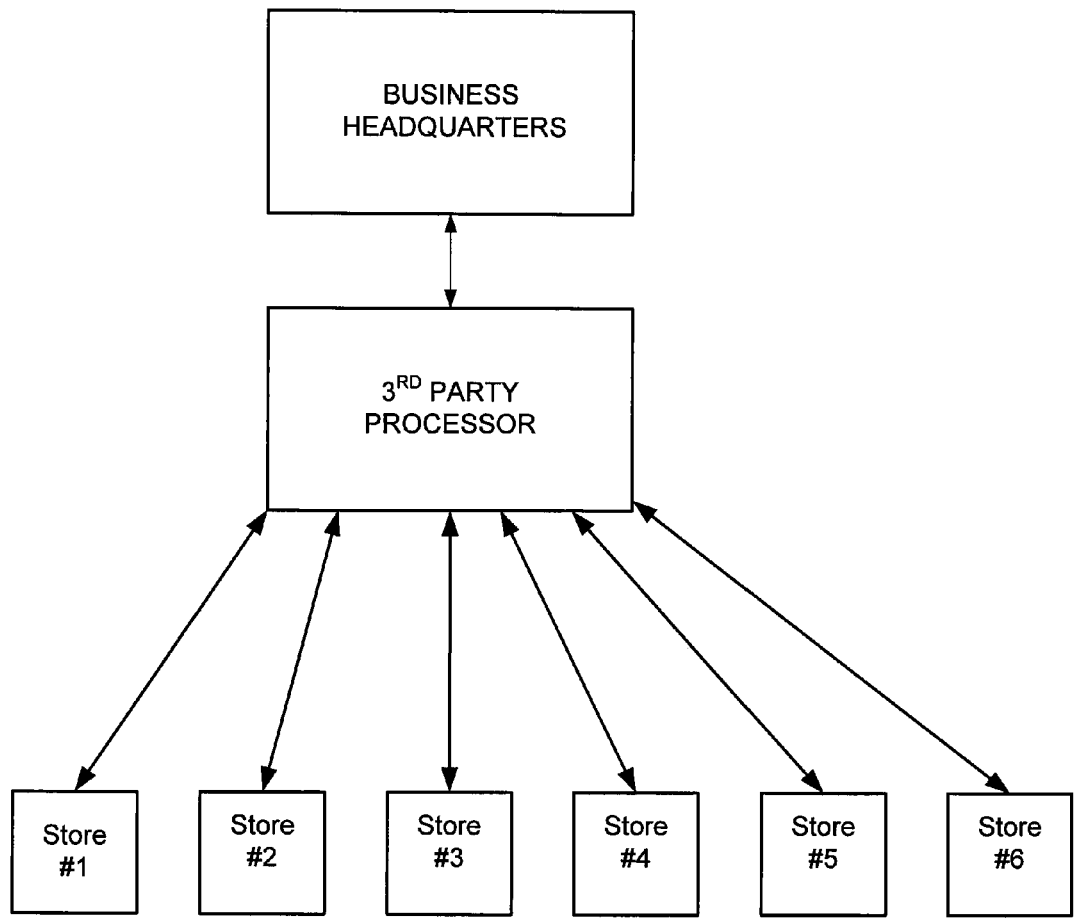
FIG. 1 illustrates an example of a system for collecting check data for reporting to a centralized administrator, in accordance with one embodiment of the invention.

Referring now to FIG. 1, a system for collecting check processing information is shown. FIG. 1 shows an embodiment in which a large business entity operates multiple store locations. The actual number of locations could vary from two locations to thousands of locations. FIG. 1 shows six store locations. The stores report in real time or in batch mode their check processing results. These results can be reported directly to a centralized location for the store or via a third party, such as a third party check processor. The third party check processor could then formulate the data and report to the business headquarters or other business entity, such as the accounting department. In addition, the third party processor could forward the check information to the Originating Depository Financial Institution associated with the business entity for check settlement.

Upon receipt of the information from the various store locations, the third party processor or the headquarters location can begin to perform various processes to detect errors, inefficiencies, and/or fraud occurring at specific store locations. For example, the reported information can be used to monitor check processing activity, current check processing status, financial values, error rates, image quality rates, and settlement paths, and to forecast final totals for each store location as well as for the business as a whole or a subdivision of the business as a whole. Moreover, the reported information may be used to determine fraud perpetrated by an individual, by a store, or occurring across a series of stores. This monitoring may take place in real-time or across multiple time horizons.

For example, if a store location historically averages $50,000 as its electronic check deposit on Tuesdays and the supervisor (e.g., the third party processor or store headquarters) detects that only $500 is registered for a current Tuesday, the supervisor could make an outbound communication to the store location to determine the problem, e.g., processing error, running late, broken equipment that requires a repairperson to be dispatched to the store, closed store, etc.

As another example, the supervisor could combine all end of day check totals to present to corporate personnel for treasury management and accounting purposes. This information can be divided further to create sub-totals for different divisions, individual store locations, or regions of the country.

As yet another example, a deterioration in imaging could be detected via centralized data gathering. For example, in a large business that has multiple locations, the imaging of checks will often be performed by cashiers who are closing out their cashier's drawer. The experience of these clerks will vary from recently hired to many years of experience. Similarly, their expertise in imaging checks will vary, as well. Thus, some will be proficient at imaging the checks and others might perform poorly. In addition, the imaging equipment might become dirty or defective with age, rough use, or poor atmospheric conditions. This will lead to a deterioration in image quality. Such a deterioration could occur over many months and at a gradual rate. Thus, it may be difficult for a store manager to notice a decrease in quality of check imaging due to the gradual rate of decline or due to the varying levels of proficiency exhibited by different employees. However, by monitoring the imaging quality and error rates at a centralized location, a business will have the capability to determine discrepancies between different store locations or compare current imaging error rates against historical error rates for a particular store. For example, if image quality rates vary between stores, then there is an indication that the imaging apparatus at the deficient store is dirty or in need of repair. If the equipment is not in need of cleaning or repair, it could also indicate to store management that training is very good at one store or very poor at another store.

A system that accumulates check processing data for more than one store, such as the centralized system shown in FIG. 1, could also be used for purposes of risk management and fraud detection. Such a system could be used to detect both merchant fraud (i.e., fraud perpetrated by a store employee) and customer fraud. The fraud detection software could be located at the merchant level and/or at the centralized monitoring location.

For example, the risk management tool could be embedded as monitoring software in the check scanning and submission process performed at each store location. The software could thus identify fraudulent activities performed by someone at the store location. Examples of activities indicating possible fraudulent activity include: duplicate item detection that is overwritten; evaluation of identical dollar amounts submitted multiple times; image quality problems indicating tampering (e.g., an attempt to increment a check number); a check lacking a signature; old dated items.

In addition this fraud detection function could be performed by software located at the supervisor that receives the images of the checks. This would allow the supervisor's software to track the above potential fraud indicators, as well. This could be accomplished by receiving the scanned check information from the stores and processing it to detect the fraud indicators.

In addition, rolling averages or other metrics could be utilized to identify anomalous data or fluctuations from historical patterns. Thus, for example, if one store has a significant number of suspected fraudulent transactions relative to other stores, then that particular store can be investigated with more scrutiny. Similarly, if one cashier has a higher number of suspected fraudulent transactions relative to other cashiers at that particular store, or relative to other cashiers at the same experience level across all stores, then that particular employee can be investigated further.

Essentially, the system allows the scanned check information to be used to detect a possible fraudulent activity at the merchant level and signal a user to investigate further.

In addition, the system can be utilized to electronically decipher check information to aid in the transaction—either in fraud identification, settlement instructions or processing information. It can be used to detect fraud perpetrated by either an employee or non-employee. This process can be implemented by electronically deciphering the data imaged during the check imaging process, either in real-time or in batch process. For example, when a check is processed, it is first scanned so as to create an image of the check. The check image can then be read using optical character recognition to convert the image into a data set. Various areas of the check instrument will correspond with standard check information. For example, the bottom of the check is designated for MICR information from which routing instructions and account numbers can be determined. Similarly, a signature block area is typically on the bottom and right side portion of the check when the check is read by a person viewing the front of the check and personal information about the check writer often appears in the upper left hand corner. The other fields can also be determined using optical character recognition that identifies the data field and converts the handwritten information into a corresponding data set for storage by the software on a computer. Having determined the data for each data field on the imaged check, additional fraud detection operations can be performed on a particular check.

For example, a profanity check can be performed to see if any profanity has been written on the check. Oftentimes when a fraudulent check is written, profanity will be written in the signature block, the memo line, the amount field, or in other fields. By scanning the check, converting the handwritten information into a data set and comparing the data set against a database of known profane words, a computer can identify checks that include profanity. As a check that contains profanity, the check can be investigated further to see if it is indeed fraudulent.

Similar to the above, some fraudulent checks are signed or made payable to fictional characters or deceased individuals.

For example, some checks are signed as "Mickey Mouse" or "Howard Hughes". Similarly, checks can be made payable to "Elmer Fudd" or "Donald Duck". Thus, a database of fraudulent signatories and a database of fraudulent payees can be configured to include predetermined names. Each check can be converted by optical character recognition so that the payee and signatory fields can be compared to these databases. If a match occurs, then further investigation can be conducted to assess the validity of the check.

Another test that can be performed is a comparison of the magnetically read MICR information to the optically read MICR information. This test is useful both for fraud detection and as a routing check. This test can be performed by magnetically reading the MICR information on a check with a magnetic check reader. The check can also be scanned so as to capture an optical image of the check. The optical image of the check can then be converted using optical character recognition to determine the corresponding value of the optically read MICR information. The magnetically read MICR information and the optically read MICR information can then be compared so as to determine any discrepancies between the two. If discrepancies exist, then the check can be analyzed further to determine if someone tried to modify the MICR information. In addition, this test can be used prior to submission of a check for settlement, since it allows a misread MICR number to be identified prior to trying to settle the check with the incorrect MICR information.

Yet another test that can be performed is whether a check has been back-dated. Since checks will be electronically converted on the same day as they are received from a customer, the merchant knows the date that should appear on the check. However, in some instances, check writers will back date a check in an attempt to prevent the check from being returned for insufficient funds if sufficient funds will be available in a few days but are not currently available. By optically reading the handwritten date on the check and converting it to a computer processable data set, software can be used to compare the optically read date to the actual date. If the check writer has written the wrong date on the check, the check can be flagged as potentially fraudulent.

Another test could be to electronically decipher the check-writer identifying information and submitted to an authorization system for use in evaluating the transaction. For example, the drivers license number could be used to search for past checkwriting history. The phone number and address could similarly be searched. Also, the fields could be used to identify a change in name/address from previous transactions on this bank account, which could indicate a fraudulent transaction.

Another test could be to optically read the name on the face of the check and compare against a database of words that typically signify a company such as Inc., Incorporated, LLC, Shop, etc. By knowing that this check was probably written by a business, as opposed to a checkwriter, the processor can make better decisions in either accepting the check or settling the transaction. For example, if the processor has indication that the check is a business check, they may choose to settle the item through image exchange and/or IRD, instead of the ACH, since many businesses block ACH debits. Another use to aid in the settlement would be to optically read the check and transmit any information related to settlement instructions, including ACH routing and payable through details that may be printed on the check.

When fraudulent activities are discovered, a business has several options. For example, the business could reject the check and not submit it for settlement. The business could alternatively accept the check and submit it for settlement. In the case of a back dated check, for example, the merchant might decide to accept the check yet use the back dating as a data point in a check writer's history. As a negative data point in the check writer's history, the business or its third party processor could form a more accurate risk assessment for that check writer the next time that check writer attempts to pay by check.

In addition to detecting fraud perpetrated by an individual, the system shown in FIG. 1 could also be used to detect fraud occurring at a particular store over an extended time period or across a range of stores in a given geographical region. For example, the system can accumulate data to determine if there are similar fraudulent incidents occurring at a particular store, such as multiple checks being received that contain profanity. Or, the system can accumulate data to determine if there is a trend of receiving checks in a particular geographical region (e.g., Houston, Tex.) that are signed by "Mickey Mouse" when other geographical areas have a much lower rate of such incidents. In that case, the system could identify a fraud occurring across a range of stores in the identified geographical region rather than in just one particular store.

Figure 4:
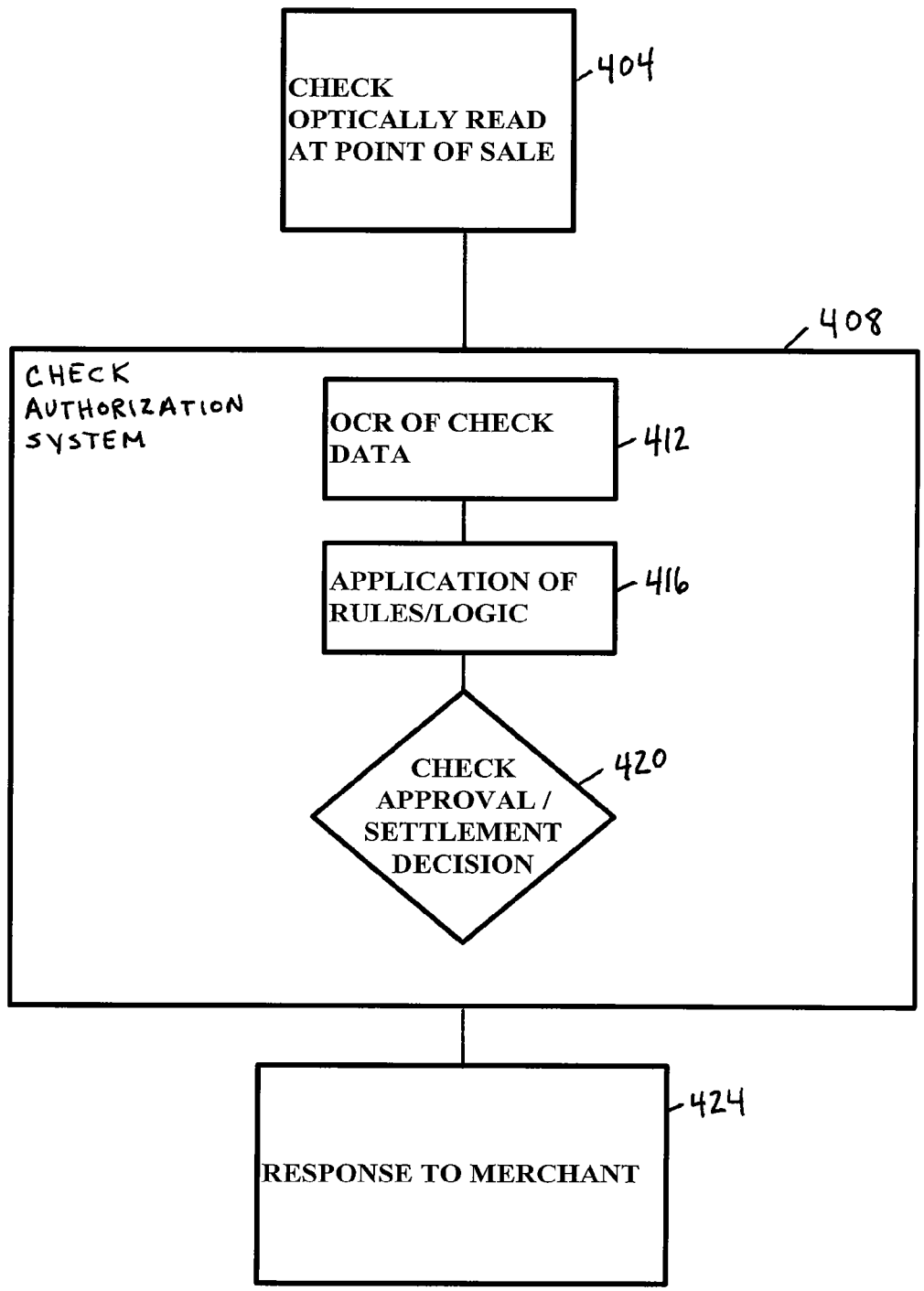
FIG. 4 illustrates a block diagram illustrating a check authorization system in accordance with one embodiment of the invention.

FIG. 4 illustrates a flowchart 400 demonstrating the use of deciphering electronic check information. While this example is used in the context of authorization, deciphering could be utilized in a variety of different check processing procedures. In FIG. 4, a check is optically read at a point of sale device, as shown by block 404. The optical image is forwarded for use by a check authorization system 408. The authorization system can then perform optical character recognition (OCR) on the image of check data so as to obtain data for different fields on the check, as shown by block 412. The authorization system can then utilize business rules and logic to evaluate the data associated with the different data fields, as shown by block 416. Based on the input of the optically determined data (and possibly other data) a check approval/settlement decision can be performed, as shown by block 420. This decision can then be communicated to the merchant, such as to the merchant's point of sale device, as shown by block 424. The merchant can then carry out the transaction with the customer in an appropriate fashion.

Figure 2:
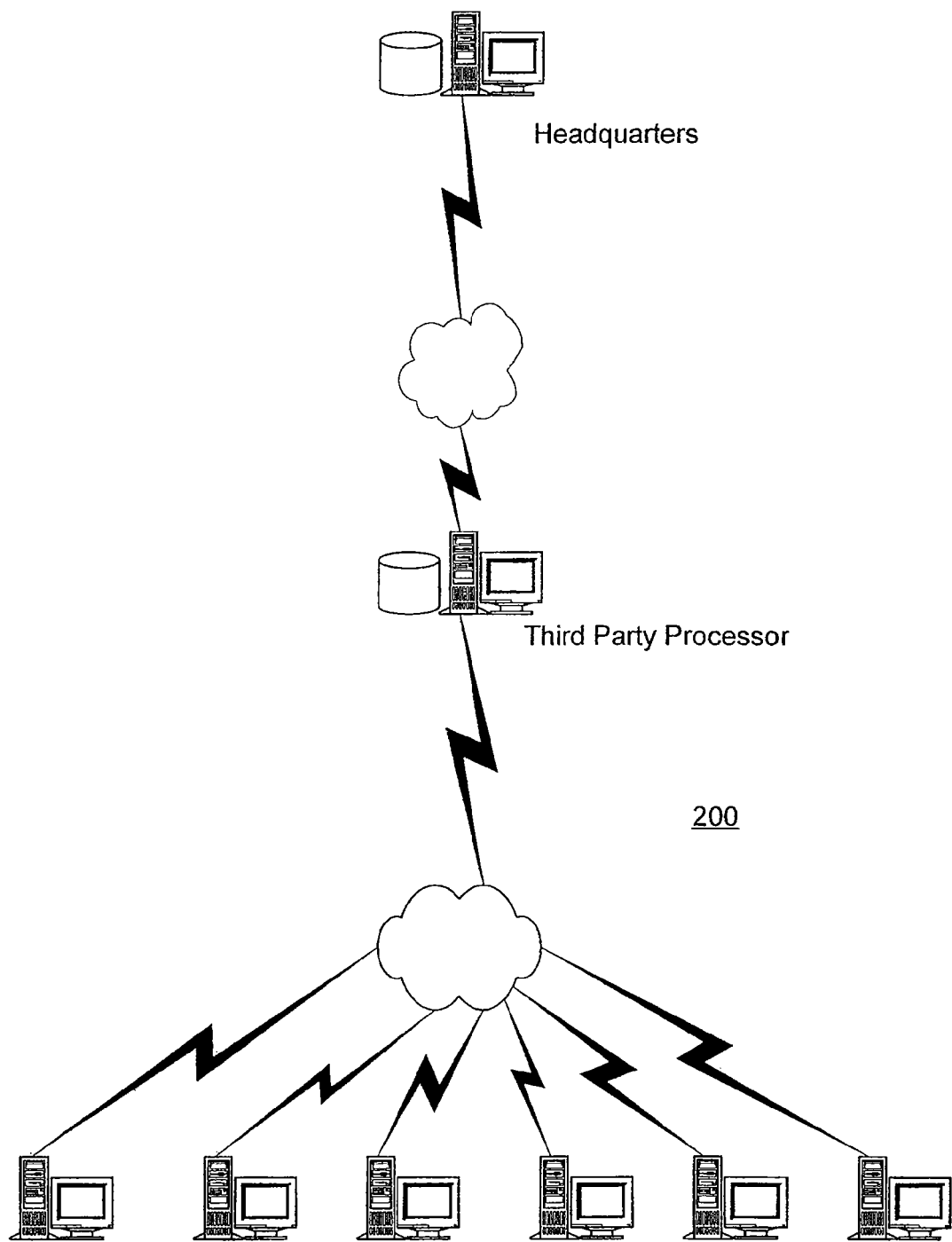
FIG. 2 illustrates a computer system that can be utilized to accomplish the system shown in FIG. 1, in accordance with one embodiment of the invention.

FIG. 2 illustrates a computer system 200 that can be utilized to implement the system shown in FIG. 1.

Figure 3:
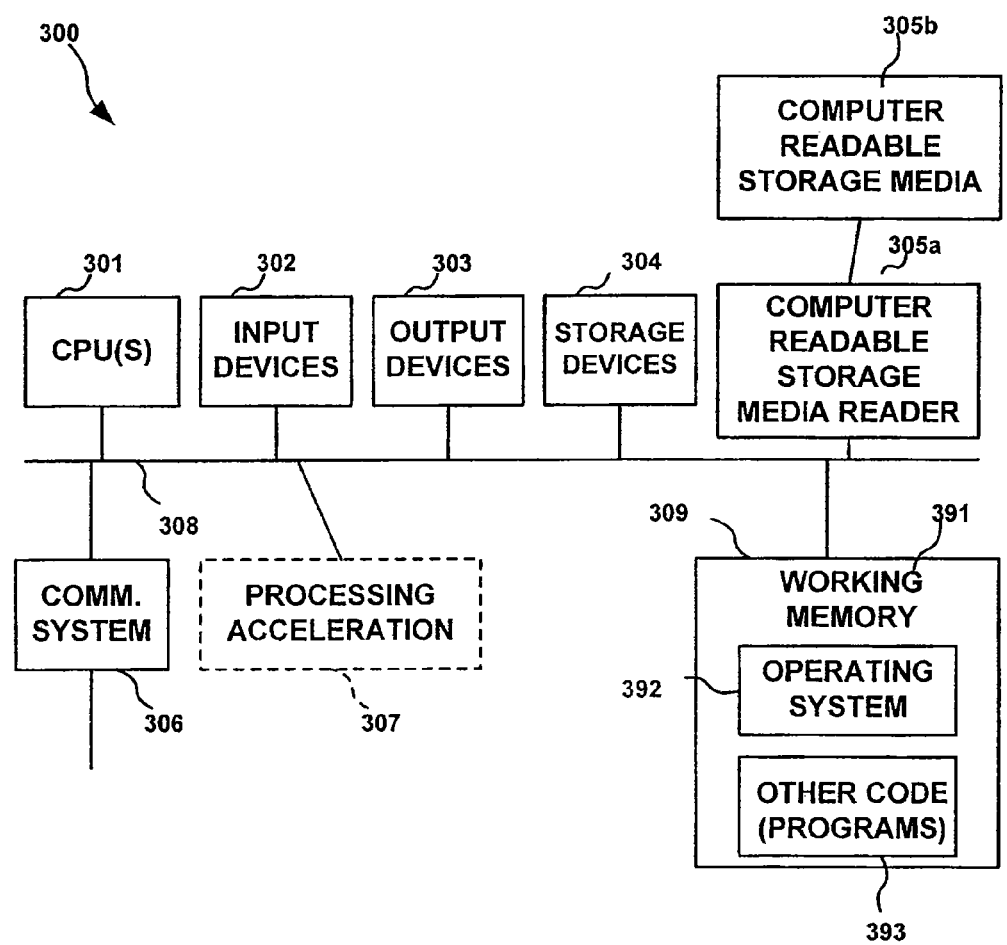
FIG. 3 illustrates a block diagram of a computer system that can be used to implement the devices shown in FIG. 2, in accordance with one embodiment of the invention.

FIG. 3 broadly illustrates how individual system elements in system 200 can be implemented. System 300 is shown comprised of hardware elements that are electrically coupled via bus 308, including a processor 301, input device 302, output device 303, storage device 304, computer-readable storage media reader 305a, communications system 306 processing acceleration (e.g., DSP or special-purpose processors) 307 and memory 309. Computer-readable storage media reader 305a is further coupled to computer-readable storage media 305b, the combination comprehensively representing remote, local, fixed and/or removable storage devices plus storage media, memory, etc. for temporarily and/or more permanently containing computer-readable information, which can include storage device 304, memory 309 and/or any other such accessible system 300 resource. System 300 also comprises software elements (shown as being currently located within working memory 391) including an operating system 392 and other code 393, such as programs, applets, data and the like.

System 300 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 300 component (e.g. within communications system 306). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized.

Figure 5:
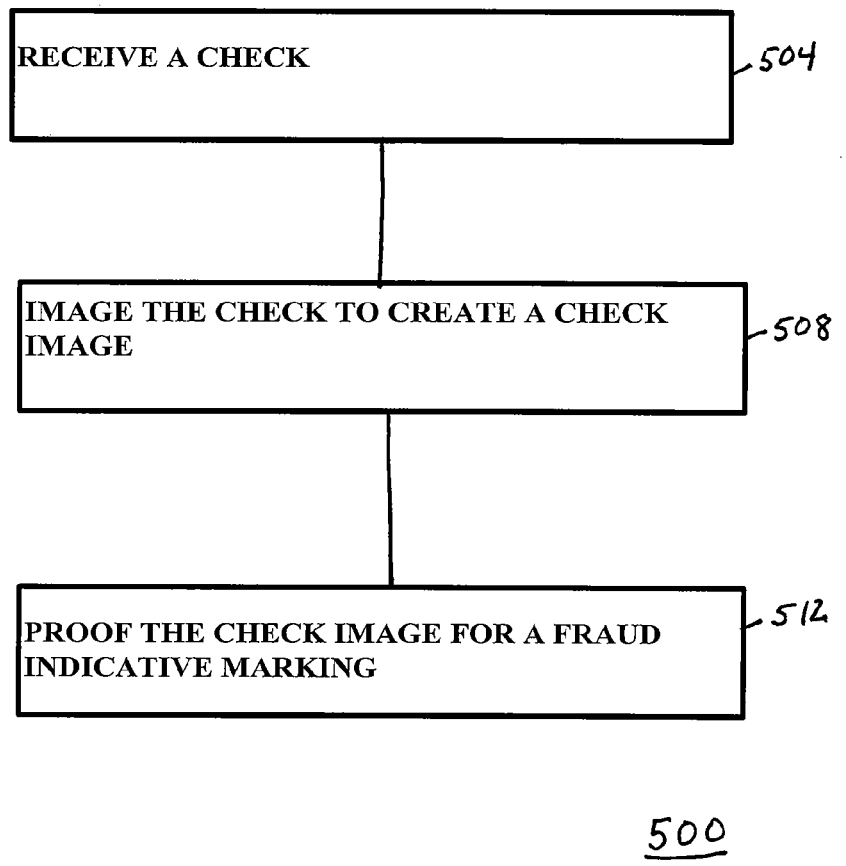
FIG. 5 illustrates a flowchart demonstrating a method of proofing a check image for a fraudulent transaction, in accordance with one embodiment of the invention.

Referring now to FIG. 5, a flowchart 500 illustrates a fraud detection method. In block 504, a check is received. For example, the check could be received at a point of sale device, at a back office conversion site, or at a central processing station. The check is imaged in block 508 so as to create a check image. The check image can be a partial image or a complete image of the check. In block 512, the image of the check is proofed or inspected for a marking indicative of fraud. This can be seen in more detail in the following embodiment.

Figure 6A:
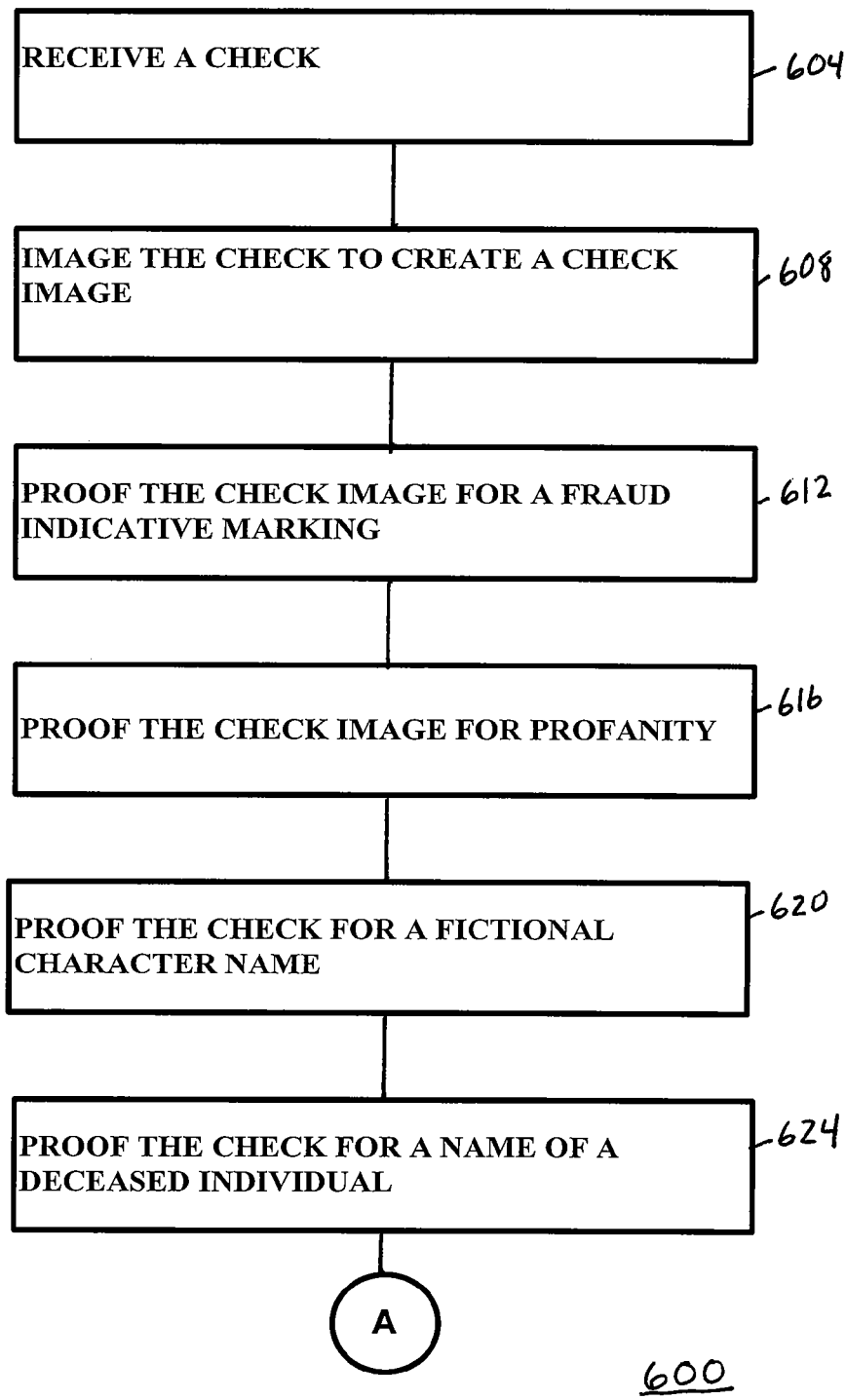
FIGS. 6A, 6B, and 6C illustrate a flowchart demonstrating a method of proofing a check for fraud in accordance with another embodiment of the invention.
Figure 6B:
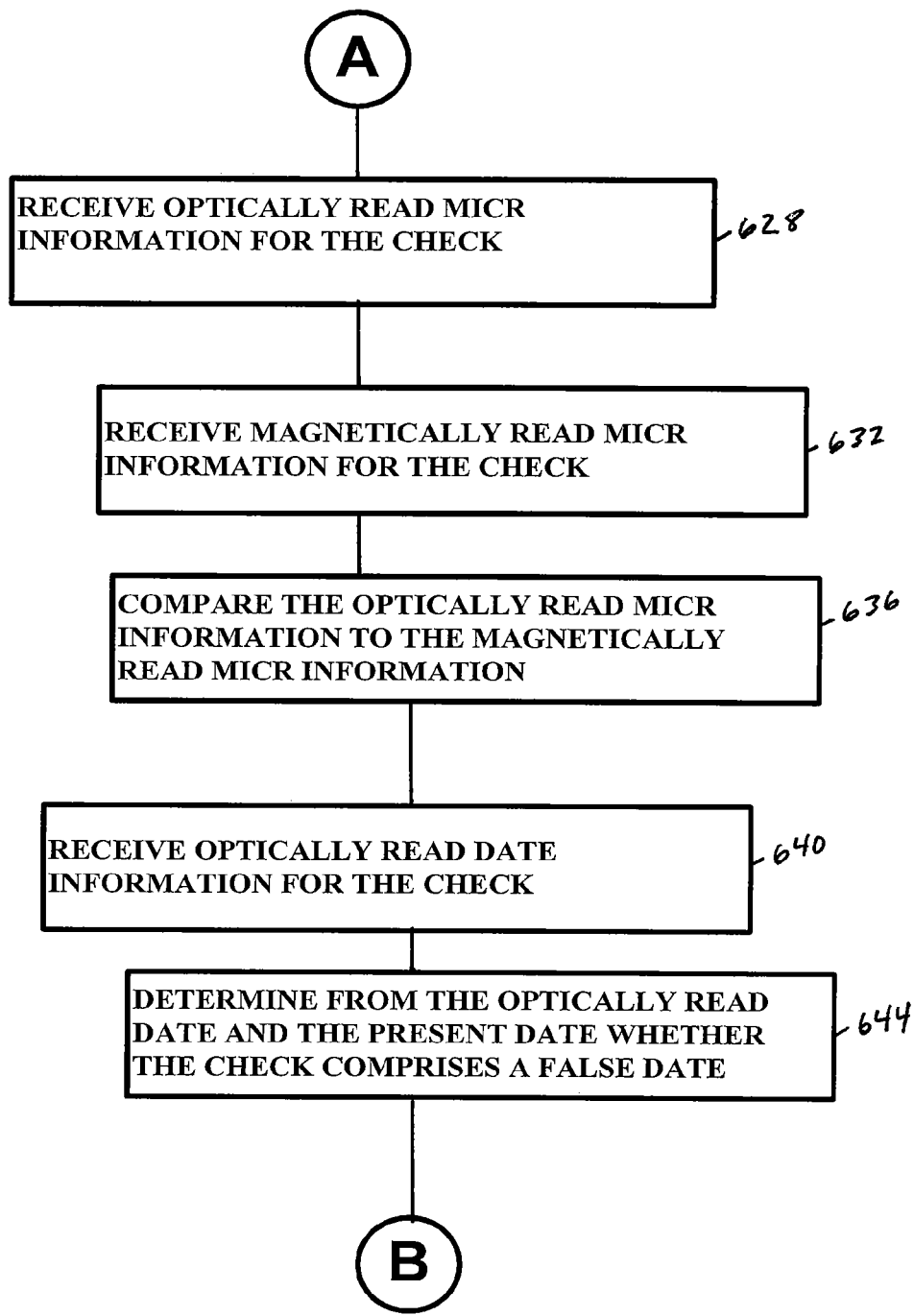
Figure 6C:
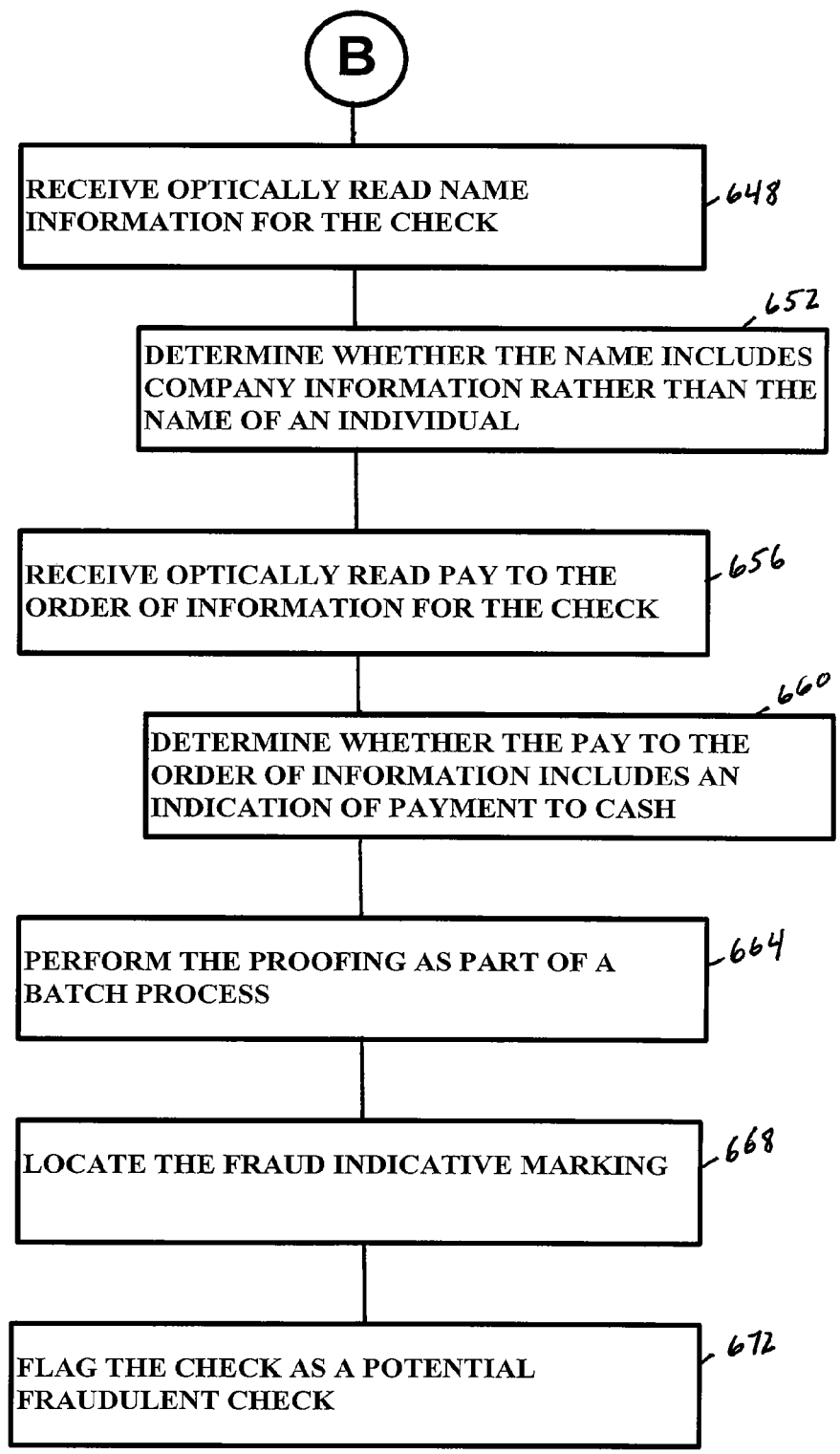

In FIGS. 6A, 6B, and 6C, a flowchart 600 illustrates different ways in which fraud indicating markings can be examined In block 604, a check is received. The check is imaged in block 608 so as to create a check image. The check image is proofed for a fraud indicative marking, as shown by block 612.

The fraud indicative marking can take a variety of forms, as shown by flowchart 600. Thus, multiple types of inspections can be made or only selected inspections can be made. In block 616, a proof of the check for profanity is made. When fraudulent checks are written, profanity on the check is sometimes present. Thus, profanity on a check can serve as an indicator of a possible fraudulent check. Block 620 shows that the check can be proofed for the presence of a fictional name in either the memo line or signature line. Similarly, block 624 shows that the check can be proofed for the name of a deceased individual.

Another test that can be performed is to optically read the MICR information from the check and forward that data to a computer for processing, as shown in block 628. Also, magnetically read the MICR information from the check and forward that data to the computer, as shown by block 632. Then, compare the optically read MICR information to the magnetically read MICR information so as to determine if there is a discrepancy between the two that would indicate tampering, as shown by block 636.

In block 640, one can optically read date information from the check. This date information can be compared to the actual date that the check was presented or on which processing is taking place. It can then be determined, as shown by block 644, whether the date that was written on the check is significantly incorrect—for example, pre-dated or post-dated.

As another test, the name information can be optically read from the check, as shown in block 648. The name information can be tested to determine if there is any company information present—such as "Inc.", "Company", "Co.", or "LLP", as shown by block 652. Such information can be used in some circumstances to determine whether a check is fraudulent.

In block 656, "Pay to the Order of" data can be scanned and optically read. A determination can then be made as to whether the "Pay to the Order of" information written on the check includes an indication of payment to "Cash". If so, that can be a factor in determining whether there is a likelihood that the check is fraudulent, as shown by block 660.

The proofing of the check can take place individually or as part of a batch process. For example, a set of checks could be imaged and submitted for proofing as part of a batch process, as illustrated by block 668 in flowchart 600.

If a check image is determined to satisfy a test that indicates a possible fraudulent check, the check image and associated physical check can be flagged as a potential fraudulent check, as shown by block 672.

Figure 7:
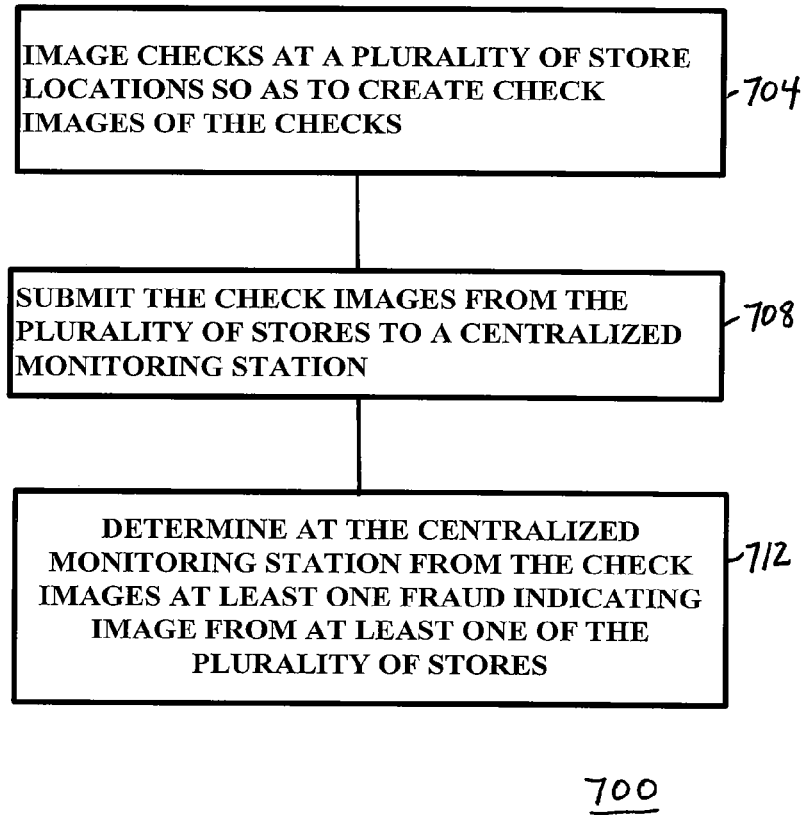
FIG. 7 illustrates a flowchart demonstrating a method of determining from a centralized monitoring station possible fraudulent activity at one of multiple stores, in accordance with one embodiment of the invention.

Referring now to FIG. 7, an embodiment of a centralized fraud detection system is illustrated by flowchart 700. In block 704, checks from multiple stores are imaged. This imaging can take place at each store at the POS devices or in the back office or even by a third party service provider. The imaging creates check images of the respective checks. The check images are then submitted to a centralized monitoring station, as shown by block 708. The centralized monitoring station can then determine from the check images whether there is at least one check image that is indicative of fraud occurring at one of the stores, as shown by block 712.

Figure 8A:
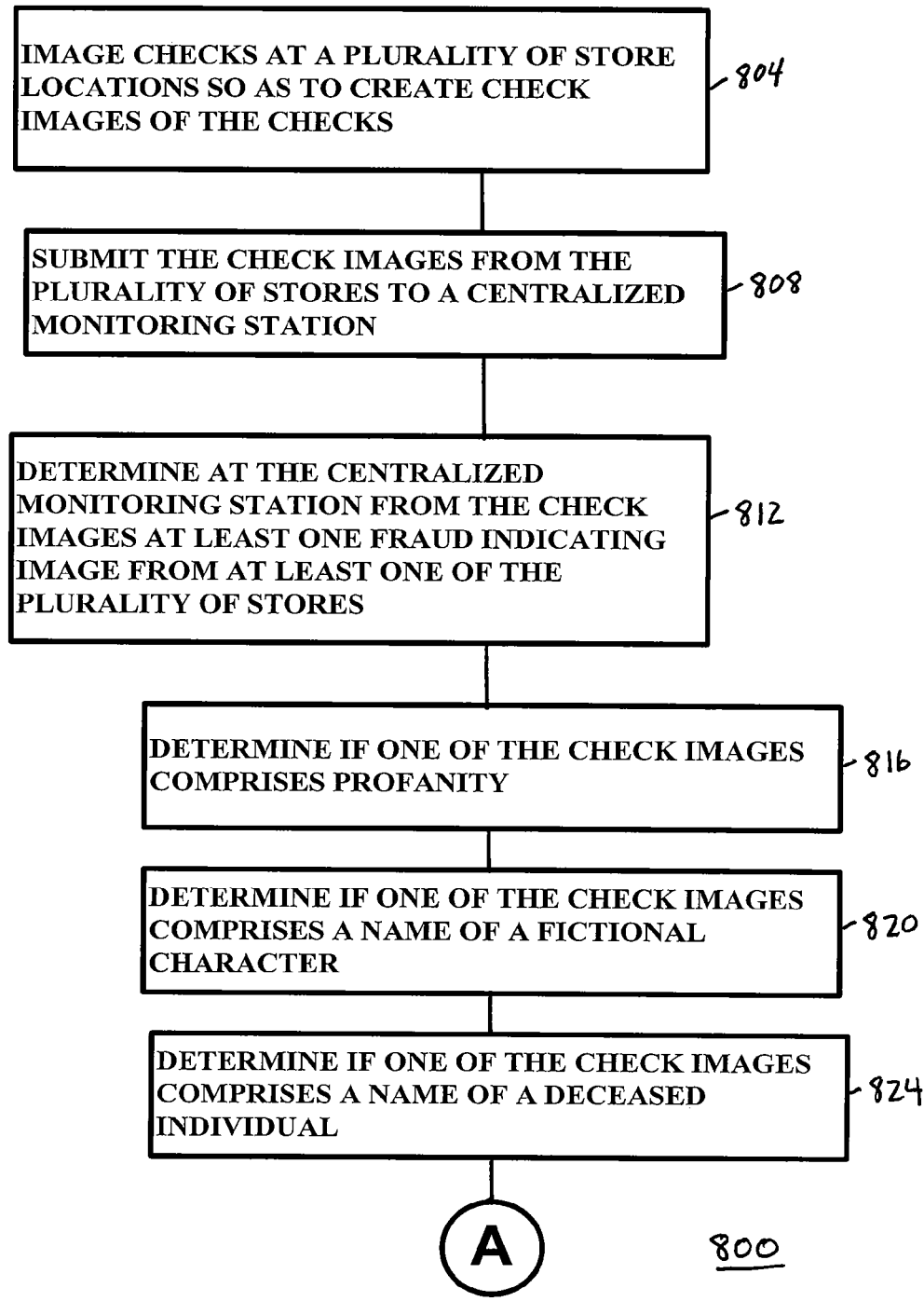
FIGS. 8A, 8B, and 8C illustrate a flowchart demonstrating a method of determining fraud, in accordance with one embodiment of the invention.
Figure 8B:
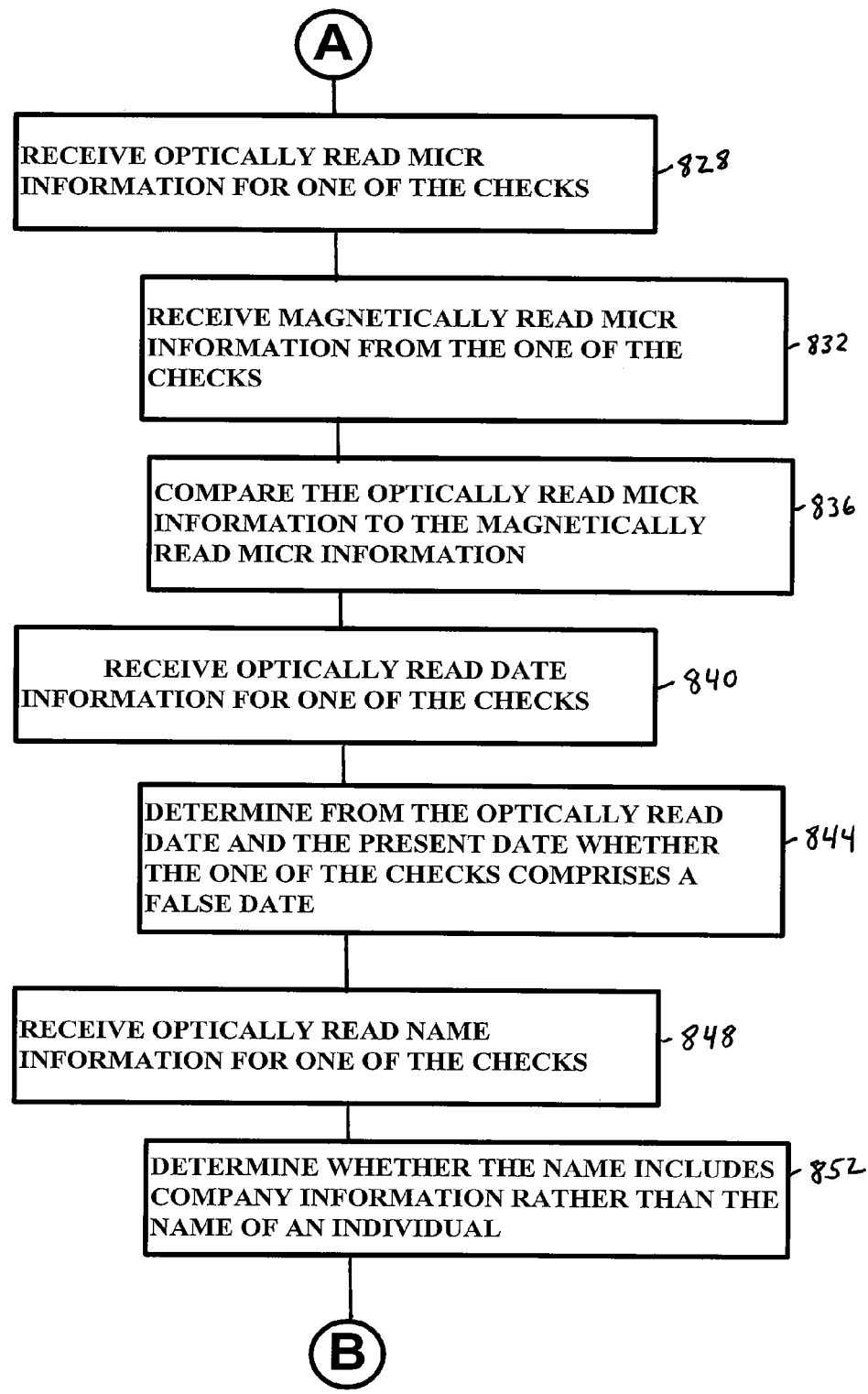
Figure 8C:
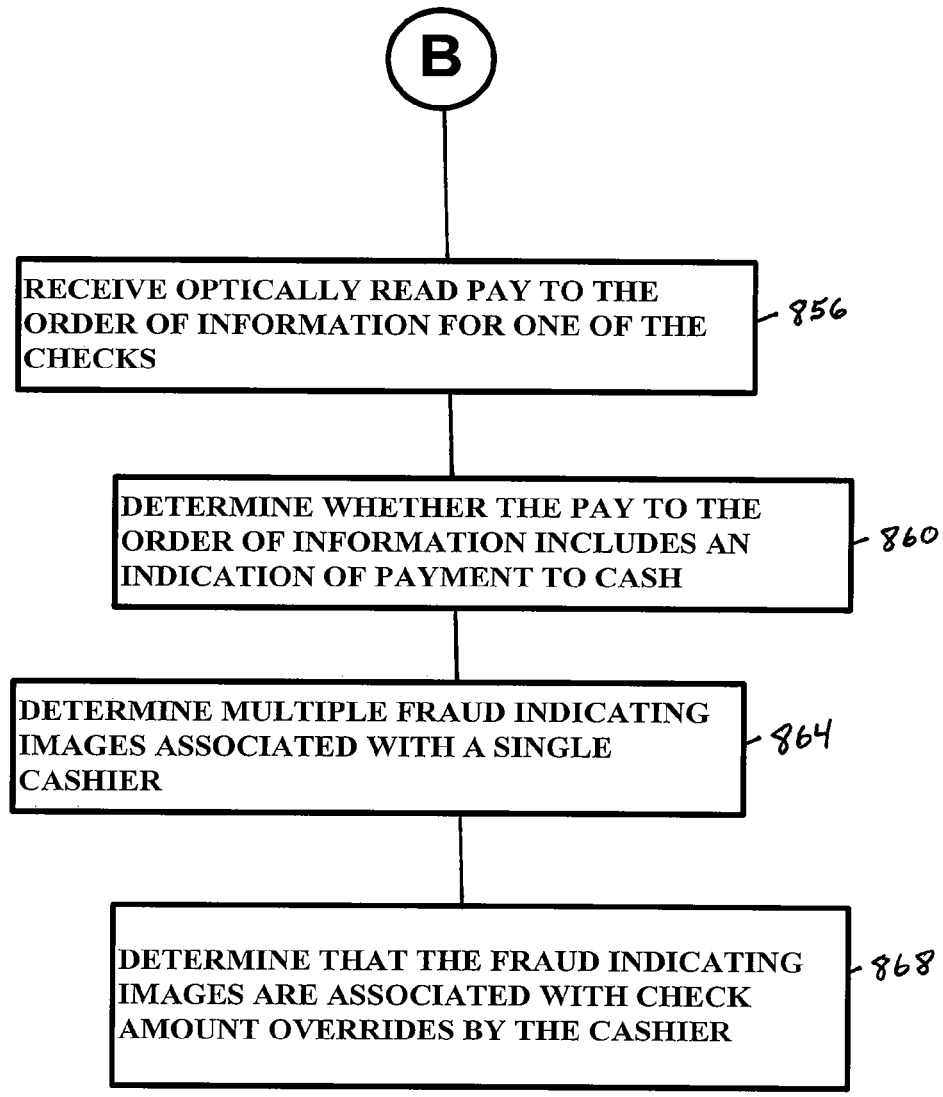

FIGS. 8A, 8B, and 8C illustrate another embodiment of centralized processing of checks for fraud detection. It should be noted that such processing could be accomplished in conjunction with other check processing functions. In block 804, checks from multiple stores are imaged so as to create corresponding check images. The check images could be complete images of the checks or only of parts of the checks. By only imaging parts of the check, data transmission requirements between the stores and the central processing computer could be reduced. In block 808, the check images are transmitted to the centralized monitoring station, which essentially can be in the form of a centrally located computer. Then, the centralized monitoring station can perform a variety of optional tests to determine if a fraud indicating image is present for at least one of the stores.

For example, as shown by block 816, a determination can be made as to whether any of the check images includes profanity. In block 820, a determination can be made as to whether one of the check images includes the name of a fictional character on the check, such as "Mickey Mouse" or "Donald Duck." Similarly, in block 824, a determination can be made as to whether any one of the checks comprises the name of a deceased individual, such as "Abraham Lincoln" or "George Washington."

Another test that can be performed is to assess the MICR information. This can be accomplished by optically reading the MICR information from one of the checks as shown by block 828 and forwarding it to the centralized monitoring station. The MICR information can also be read magnetically from the same check. This data can also be sent to the centralized monitoring station, as shown by block 832. Then, in block 836, the optically read MICR data and the magnetically read data can be compared. If there is a discrepancy, a possible fraudulent check could be signaled.

In block 840, optically read "date" information can be received for one of the checks. As shown in block 844, this information can be compared to the present date so as to assess the possibility that the check was pre-dated or post-dated.

In block 848, the checks can be optically imaged to determine "name" information. If the name printed on the check includes company signifying information, then that can be factored into whether the check is likely fraudulent, as shown in block 852.

In block 856, the "Pay to the Order of" information can be scanned and optically read. As shown by block 860, a determination can then be made as to whether the "Pay to the Order of" information includes an indication of payment to "Cash." If so, that can be used to assess whether the check is possibly fraudulent.

Each of these tests can be employed separately or in conjunction with one another (as well as other tests) by employing logical rules pre-programmed to assess the possibility of a check being fraudulent.

Flowchart 800 also illustrates that a single store or cashier can be identified as possibly engaging in merchant fraud, as shown by block 864. For example, if a cashier has an anomalous number of checks flagged as potentially fraudulent, that cashier might be flagged as possibly engaging in fraud. Since cashiers often have discretion to override the check amount when there is a discrepancy between the number entered on a check and the written amount entered on that check, a cashier might commit fraud by resolving the discrepancy in favor of the higher amount. This is shown for example by block 868.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents

What is claimed is:

1. A method of determining possible fraudulent checks, said method comprising:
    receiving a check;
    imaging said check to create a check image;
    proofing said check image for a fraud indicative marking;
    locating said fraud indicative marking;
    flagging said check as a potential fraudulent check;
    generating an output indicating said potential fraudulent check;
    wherein said proofing said check image comprises proofing said check image for profanity;
    wherein said proofing said check image comprises proofing said check for a fictional character name; and
    wherein said proofing said check image comprises proofing said check for a name of a deceased individual.

2. The method as claimed in claim 1 and further comprising:
    performing said imaging and proofing as part of a batch process.

3. The method as claimed in claim 1 wherein said proofing said check image comprises:
    receiving optically read MICR information for said check;
    receiving magnetically read MICR information for said check;
    comparing said optically read MICR information to said magnetically read MICR information.

4. The method as claimed in claim 1 wherein said proofing said check image comprises:
    receiving optically read date information for said check;
    determining from the optically read date and the present date whether said check comprises a false date.

5. The method as claimed in claim 1 wherein said proofing said check image comprises:
    receiving optically read name information for said check;
    determining whether said name includes company information rather than the name of an individual.

6. The method as claimed in claim 1 wherein said proofing said check image comprises:
    receiving optically read PAY TO THE ORDER OF information for said check;
    determining whether said PAY TO THE ORDER OF information includes an indication of payment to CASH.

7. The method as claimed in claim 1 and further comprising:
    performing said proofing as part of a batch process.

8. A method of processing checks, said method comprising:
    imaging checks at a plurality of store locations so as to create check images of said checks;
    submitting said check images from said plurality of stores to a centralized monitoring station;
    determining at said centralized monitoring station from said check images at least one fraud indicating image from at least one of said plurality of stores, wherein said determining comprises proofing said check image for a fraud indicative marking; wherein said proofing said check image comprises proofing said check image for profanity; wherein said proofing said check image comprises proofing said check for a fictional character name; and wherein said proofing said check image comprises proofing said check for a name of a deceased individual;
    generating an output indicating said at least one fraud indicating image.

9. The method as claimed in claim 8 and further comprising:
    determining multiple fraud indicating images associated with a single cashier.

10. The method as claimed in claim 9 and further comprising:
    determining that said fraud indicating images are associated with check amount overrides by said cashier.

11. The method as claimed in claim 8 wherein said determining at said centralized monitoring station comprises:
    receiving optically read MICR information for one of said checks;
    receiving magnetically read MICR information from said one of said checks;

comparing said optically read MICR information to said magnetically read MICR information.

12. The method as claimed in claim 8 wherein said determining at said centralized monitoring station comprises:
receiving optically read date information for one of said checks;
determining from the optically read date and the present date whether said one of said checks comprises a false date.

13. The method as claimed in claim 8 wherein said determining at said centralized monitoring station comprises:
receiving optically read name information for one of said checks;
determining whether said name includes company information rather than the name of an individual.

14. The method as claimed in claim 8 wherein said determining at said centralized monitoring station comprises:
receiving optically read PAY TO THE ORDER OF information for one of said checks;
determining whether said PAY TO THE ORDER OF information includes an indication of payment to CASH.

* * * * *